United States Patent
Palermo

(10) Patent No.: US 11,344,146 B2
(45) Date of Patent: May 31, 2022

(54) COOKER AND FABRICATED COMPONENTS FOR CONSTRUCTING THE COOKER

(71) Applicant: Raymond Palermo, Marietta, GA (US)

(72) Inventor: Raymond Palermo, Marietta, GA (US)

(*) Notice: Subject to any disclaimer, the term of this patent is extended or adjusted under 35 U.S.C. 154(b) by 310 days.

(21) Appl. No.: 16/578,760

(22) Filed: Sep. 23, 2019

(65) Prior Publication Data

US 2021/0085117 A1 Mar. 25, 2021

(51) Int. Cl.
*A47J 37/07* (2006.01)
*A47J 27/00* (2006.01)
*A47J 36/06* (2006.01)
*A47J 36/02* (2006.01)
*A47J 37/06* (2006.01)

(52) U.S. Cl.
CPC ............. *A47J 27/002* (2013.01); *A47J 36/02* (2013.01); *A47J 36/06* (2013.01); *A47J 37/067* (2013.01); *A47J 37/07* (2013.01); *A47J 2037/0777* (2013.01)

(58) Field of Classification Search
CPC .. A47J 37/067; A47J 37/0676; A47J 37/0682; A47J 37/07; A47J 37/0718; A47J 2037/0777; F24C 1/16; F24B 1/20; F24B 1/202; F24B 1/205; F24B 1/207; F24B 3/00
USPC .............. 126/25 R, 29, 30, 27, 28, 26, 25 A, 126/25 AA, 25 B, 25 C, 9 R, 9 A, 9 B, 126/23, 38
See application file for complete search history.

(56) References Cited

U.S. PATENT DOCUMENTS

| | | | | |
|---|---|---|---|---|
| 2,102,893 | A | * | 12/1937 | Forster ...................... F24C 1/16 126/36 |
| 2,244,935 | A | * | 6/1941 | Binger ...................... F24C 1/16 126/9 R |
| 3,301,172 | A | | 1/1967 | Haro |
| 3,812,836 | A | * | 5/1974 | Jackson .................... F24C 1/16 126/9 R |
| 4,463,746 | A | | 8/1984 | Unr |
| D284,543 | S | | 7/1986 | Huls |
| D289,847 | S | | 5/1987 | Kogyo |
| 4,922,887 | A | * | 5/1990 | Foxford ............. A47J 37/0713 126/29 |
| 5,119,799 | A | * | 6/1992 | Cowan .................... F24B 1/205 126/9 R |
| 5,211,105 | A | | 5/1993 | Liu |
| 5,404,864 | A | | 4/1995 | Kent, Jr. |
| 5,425,352 | A | | 6/1995 | Gillam et al. |
| 5,797,386 | A | | 8/1998 | Orr |
| 6,026,802 | A | * | 2/2000 | Patterson .................. F24C 1/16 126/201 |
| D475,571 | S | | 6/2003 | Hopkins |
| 6,782,801 | B1 | | 8/2004 | Correa |
| 6,941,942 | B2 | | 9/2005 | Eisinger et al. |
| D541,486 | S | | 4/2007 | Mahaffey |

(Continued)

*Primary Examiner* — John J Norton
(74) *Attorney, Agent, or Firm* — Smith Tempel Blaha LLC; Gregory Scott Smith

(57) ABSTRACT

A cooker that includes a base, a fire bowl with a cooking surface on top of it and, a cover/lid or dome that rests over the cooking surface. An exemplary embodiment of the cooker can be described as a naturally fired outdoor cooker constructed of a light weight, aluminum extrusions that can be reoriented to easily create the base with a minimum number of design elements.

20 Claims, 16 Drawing Sheets

(56) References Cited

U.S. PATENT DOCUMENTS

| | | |
|---|---|---|
| 7,219,663 B2 | 5/2007 | Cuomo |
| D551,034 S | 9/2007 | Truhan |
| D573,466 S | 7/2008 | White |
| D730,680 S | 6/2015 | Palermo |
| 9,220,369 B1 | 12/2015 | Yelverton |
| D772,648 S | 11/2016 | Palermo |
| 10,058,210 B2 | 8/2018 | Palermo |
| 10,231,575 B1 | 3/2019 | Nicoll et al. |
| 10,264,919 B2 | 4/2019 | Wenzel et al. |
| 2015/0068512 A1 | 3/2015 | Mehler et al. |
| 2017/0172344 A1 | 6/2017 | Romano |
| 2017/0318999 A1 | 11/2017 | Han et al. |
| 2018/0082994 A1* | 3/2018 | Han .................... H01L 27/0259 |
| 2018/0110367 A1 | 4/2018 | Baker |
| 2018/0252414 A1* | 9/2018 | Greiwe .................. F24B 1/189 |
| 2018/0372324 A1* | 12/2018 | Gamble .................. A45F 4/00 |

* cited by examiner

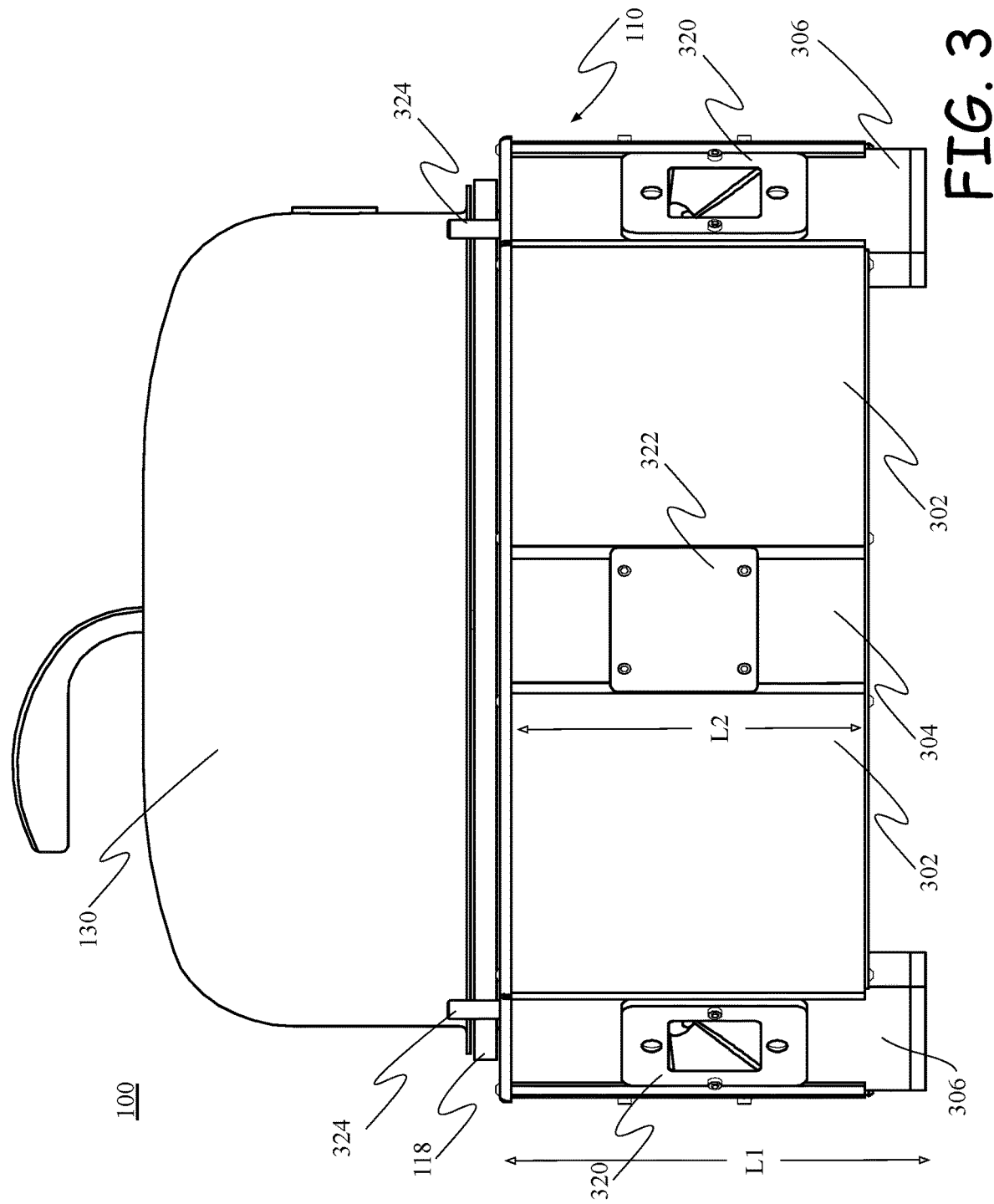

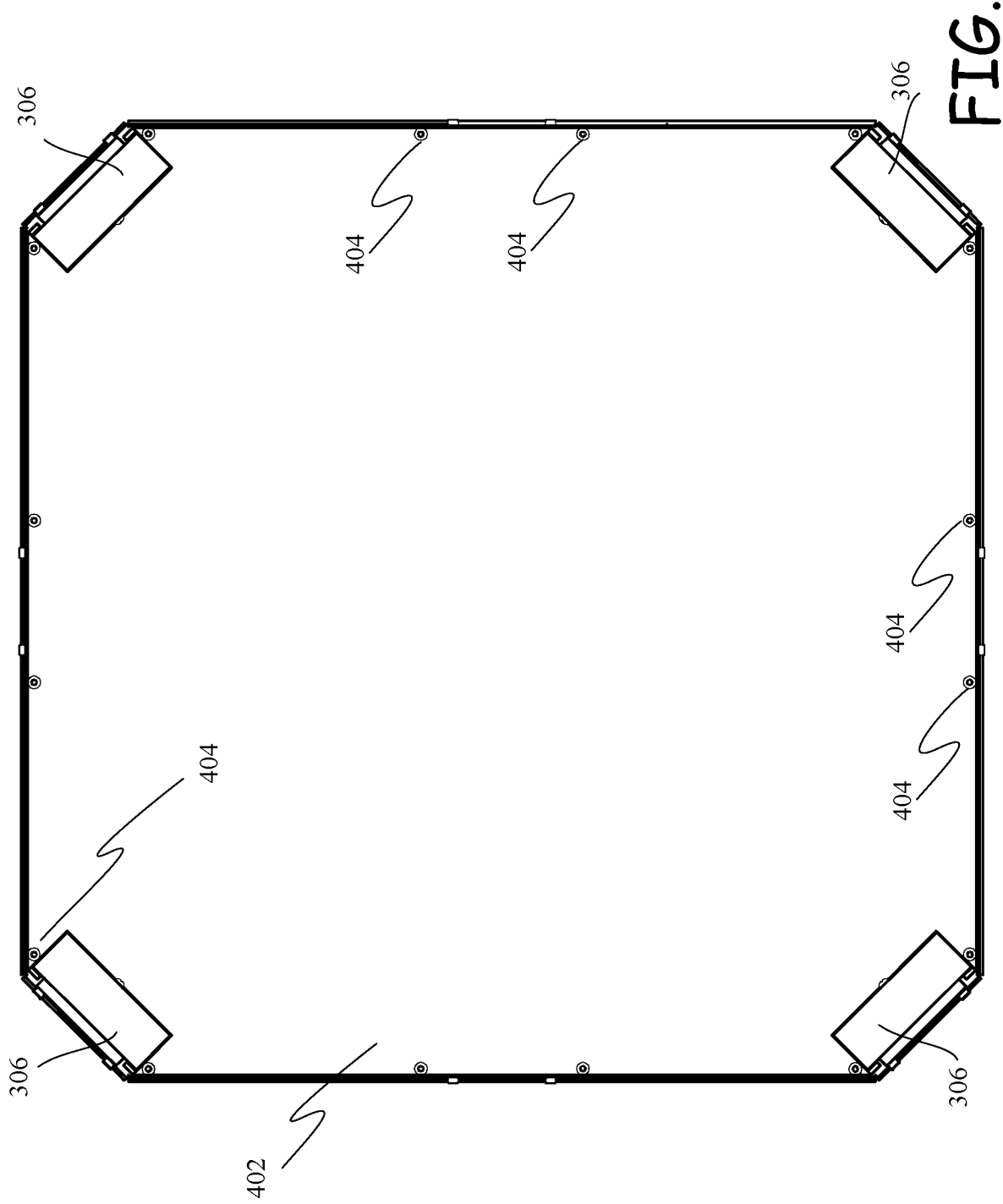

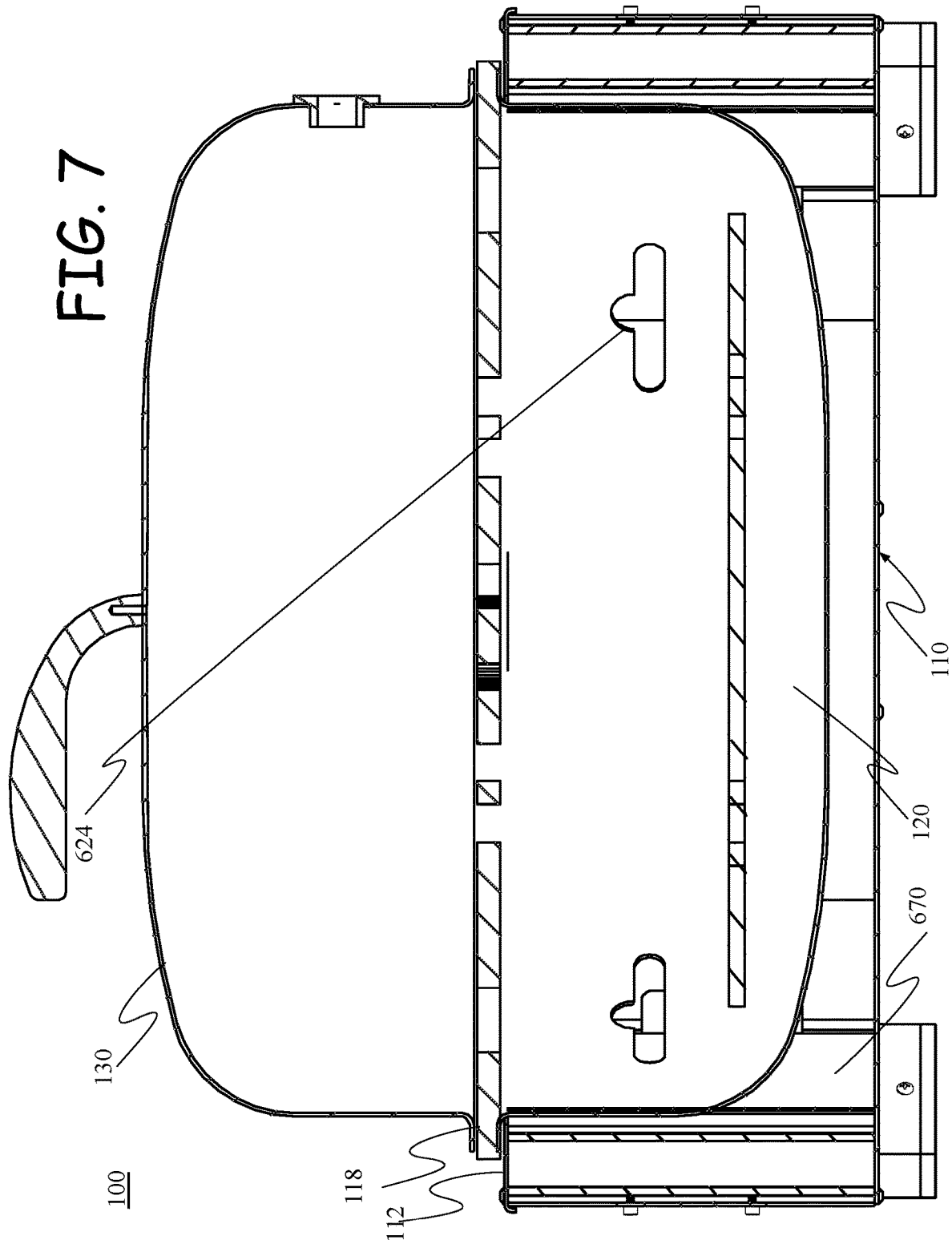

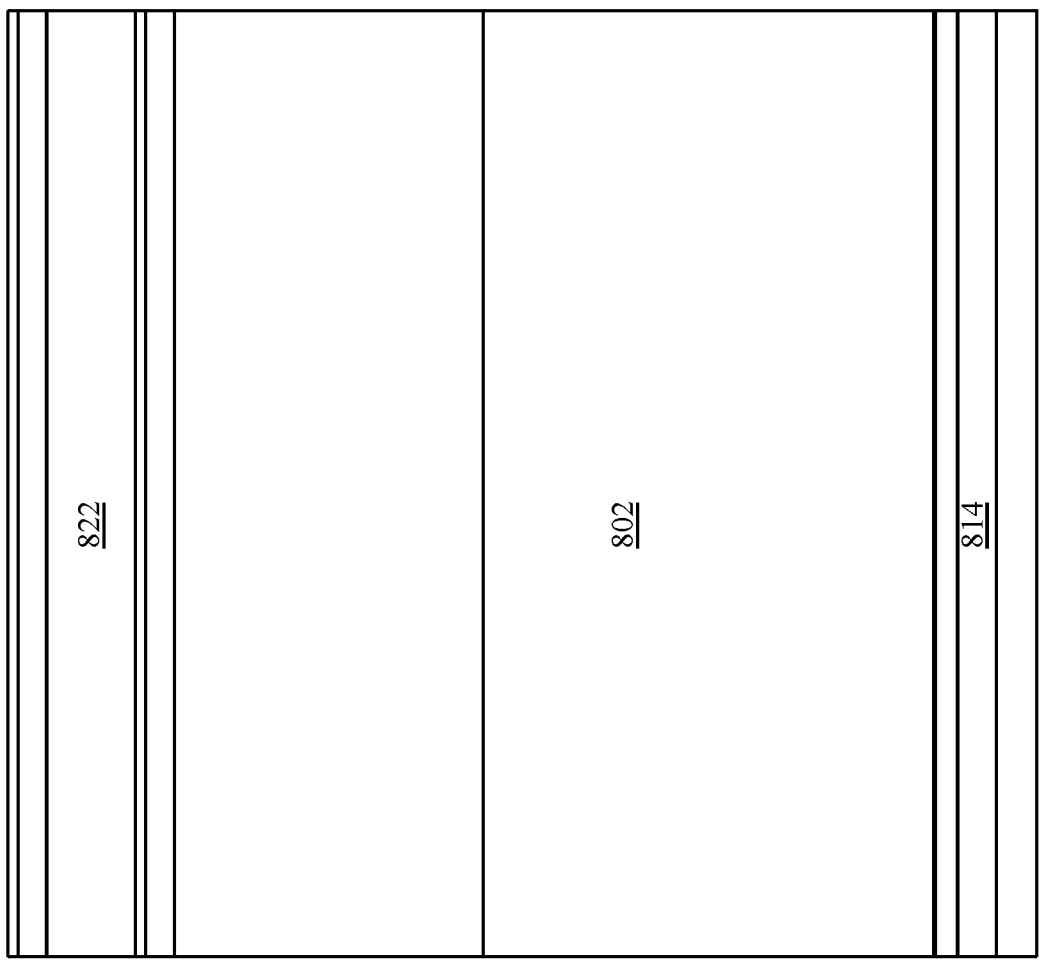
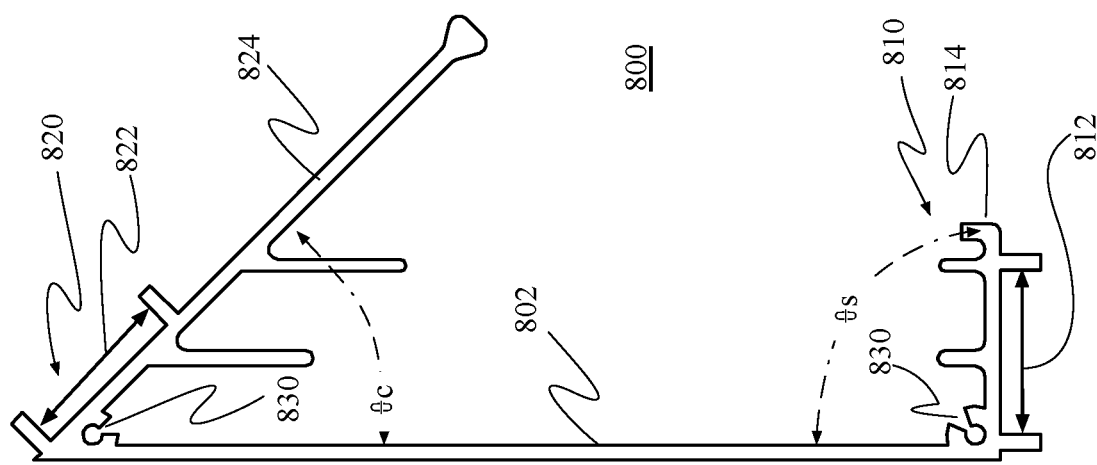
FIG. 8C
FIG. 8B

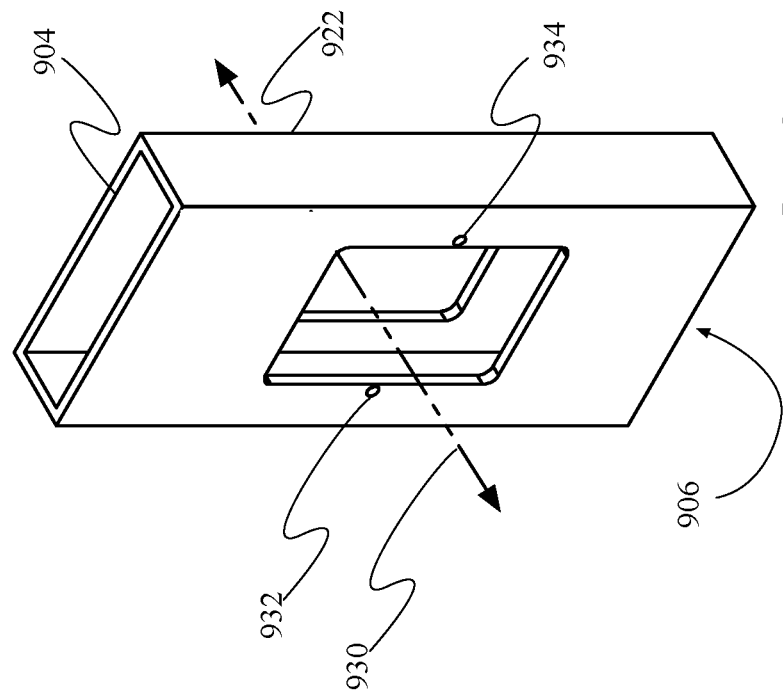
FIG. 9A
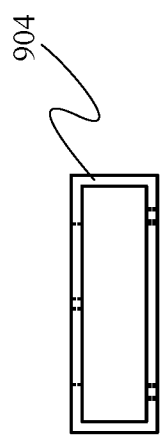
FIG. 9D
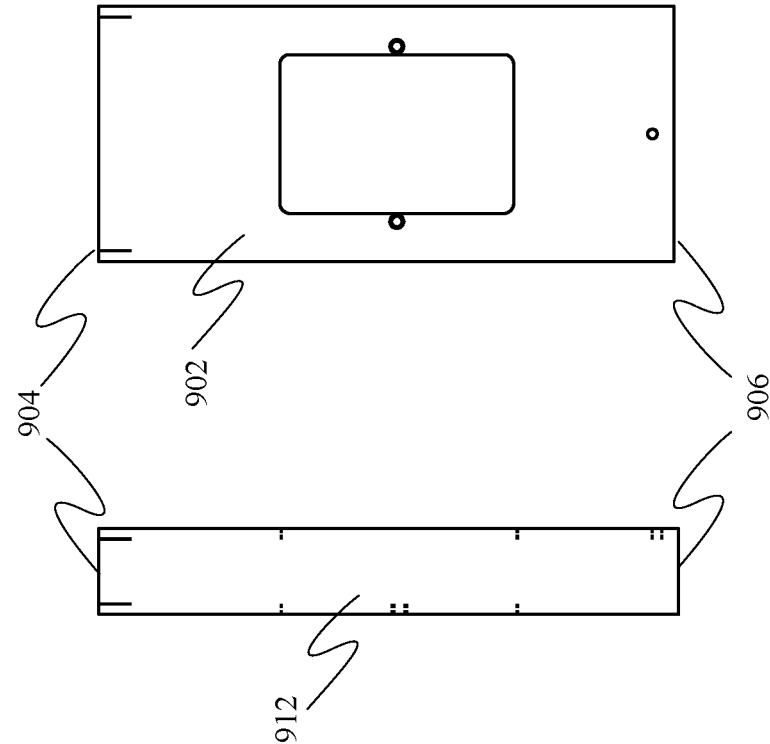
FIG. 9B
FIG. 9C

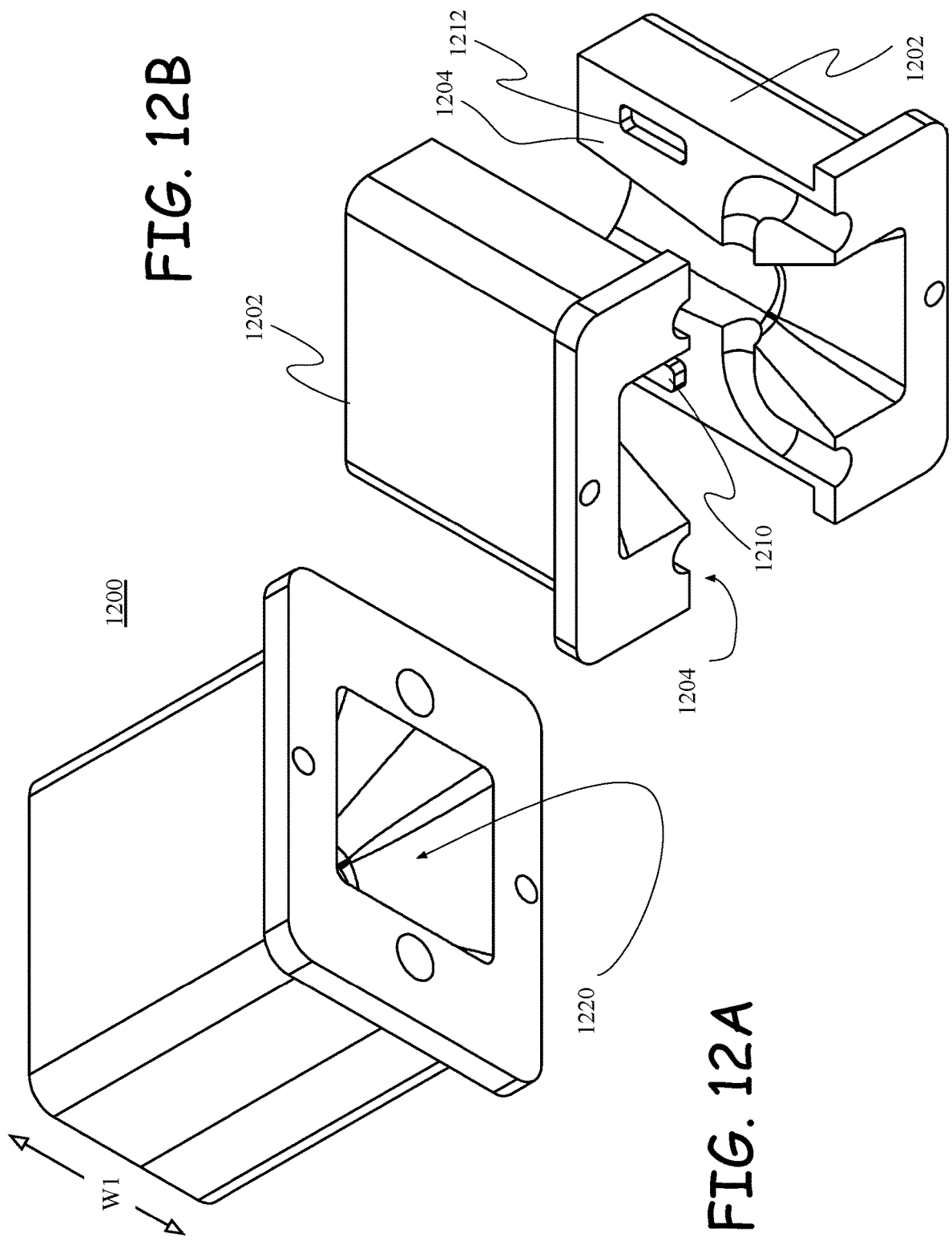

COOKER AND FABRICATED COMPONENTS FOR CONSTRUCTING THE COOKER

CROSS-REFERENCE TO RELATED APPLICATIONS

This application hereby incorporates by reference in its entirety, U.S. Pat. No. 10,058,210 issued on Aug. 28, 2018 from U.S. application Ser. No. 14/068,615.

BACKGROUND

Today's market is flooded with a staggering array of cookers, grillers, smokers and fryers. These burly apparatuses come in all shapes and sizes, including built in accessories, knobs, wheels, interfaces to a trailer hitches, etc. One can buy portable, stationary, indoor, outdoor and towable versions. Driving up to the local home improvement store, one is met in the parking lot with a parade of such cookers, smokers, grillers, etc., like puppies in a pet store window tempting you to grab one and take it home.

In many places, the grill has become the central element of the back yard. Many people have or long to have the rugged stone faced out door kitchen with a built in grill. And when the weather is nice and the bugs are not thick in flight, we see many vacating the comforts of their home and lounging outside while dinner is prepped and then eaten on elaborate patios.

But like fine art, it seems that one can spend however much money they want to on vamping up their outdoor cooking capabilities. But one problem is that at the end of the day, your outdoor cooking haven is confined to your back yard. What is needed is a cooking device that is affordable, reliable and portable. Thus, one can recreate their outdoor cooking extravaganza at a football tail gate, camping trip or even a visit to the friend's pool.

In addition, while most of the cookers appear to be space-age cool, laden with the most awesome new features, their ability to produce fine quality food in a consistent manner is lacking. What is needed in the art is a cooking device that has been designed with its main focus being its foremost purpose—cooking.

Another issue that many face is what style of cooking device to purchase. Do they want a smoker, griller, fryer, oven, etc. Many products on the market claim to address the multi-purpose cooking segment but, as previously described, they generally look good but are inadequately designed such that they do not function properly or well.

And now, one of the most important issues, can you grill a steak at a restaurant quality level? There is a little known secret that separates the home cooked steak from the restaurant cooked steak. This secret is tied to the equipment but more particularly deals with the temperature that the steak is cooked. To accomplish this, one needs to have a cooker that can reach great temperatures. Most outdoor cookers are going to start topping out at 300-500 degrees F. Many grills will start to fail beyond this temperature causing damage to the grill, melting pieces of the grill or the grill itself. What is the temperature that the high-end steak houses use? Many use equipment that reach over 1000 degrees F. You are not going to find this in your typical backyard set up. What is needed in the art is a cooking device that not only operates as a professional quality cooking device, a cooking device that can meet or exceed the temperatures used in high-end restaurants and that can also be used for a variety of cooking types and scenarios.

Finally, because the consumer is already paying an arm and a leg for a two inch ribeye, another arm and a leg for the grill puts one at a great disadvantage. Thus, there is a need in the art for a cooker that meets all the above-listed needs and that is reasonably affordable. The costs for various products can be driven by the materials, the parts, the labor required in manufacturing and assembly and shipping. What is needed in the art is a cooker that has a reduced cost by utilized materials, reduced part count, ease of manufacture and assembly and low cost shipping.

BRIEF SUMMARY

The present disclosure presents various embodiments, features, aspects, functions, characteristics, etc. of a cooker. In general, embodiments include a base, a fire bowl with a cooking surface on top of it and, a cover/lid or dome that rests over the cooking surface. An exemplary embodiment of the cooker can be described as a naturally fired outdoor cooker constructed of a light weight material, a stainless steel fire bowl and a dome lid. A grilling surface constructed out of carbon steel and a construction that helps to distribute heat by providing a heat sinking mechanism.

As will be seen in greater detail, embodiments of the cooker include a base that is designed to be assembled out of three distinct parts that can all be adjoined to create the base of the cooker. Once assembled, the base defines a void for receiving a fire bowl and providing a surface for receiving a grate.

The cooker is aspirated through the use of one or more openings, each opening or at least one opening being a venturi. The venturi opening automatically operates or is configured to regulate the amount of airflow that is brought to the fire based at least in part on the airflow demand created by the fire and the unique shape of the venturi.

Various embodiments of the versatile cooker can be used as a stovetop device, a grill, a high heat oven, a wok cooker, as well as a variety of other uses. The various embodiments of the cooker advantageously utilize one or more of three heat types: radiant, conductive and convection. An example of radiant heat is the heat transferred and used to cook a device that is held near to a flame or source of heat. For example, a hotdog being held on a stick next to a flame is being cooked with radiant heat. Conductive heat is heat that is delivered from a source to a destination through another medium, such as a cooking surface as in the case of a frying pan. As such, a hotdog in a frying pan would be exposed to conductive heat. Convection is when heat is transferred around an object to be cooked in a fluid type medium, including air, water, etc. For instance, a hotdog in a pot of boiling water would be cooked by means of convection.

One advantage of the various embodiments of the disclosed cooker is that all three of these heat types can be applied in tandem or simultaneously. As an example, in one embodiment of the cooker in which a stone cooking surface is utilized, a pizza can be cooked. The pizza dough would lie on the stone and be cooked from the bottom using conductive heat. The edges of the pizza can be toasted, crispy and maybe even a touch of burnt from the flame licking up around the stone cooking surface for radiant heat. Finally, the cheese and ingredients on top of the pizza are cooked by air in the dome or cover of the cooker. As another example, a steak can be cooked within the versatile cooker utilizing each of these three heat sources as follows: the steak is seared by laying it on a great constructed of a thick piece of cut carbon steel creating a grilling surface that can be heated to a high temperature, such as 900-1000+ degrees F. (conductive), while the meat is charred on its surface by the flames and coals through the openings in the grate (radiant) and surrounded by a constant air temperature under the dome or lid (convection). In addition to these three heating techniques, the smoke from the heat source is also infused into the cooking environment.

An exemplary embodiment is a cooker base for receiving a fire bowl, grate and cover. In various embodiments, the cooker base includes extension pieces, wherein each extension piece includes a side expansion receptor on a first end of a plate and a corner expansion receptor on a second end of the plate. Further the cooker base includes expansions, wherein each expansion includes a first side and a second side, and the first side and second side are configured to mate with the side expansion receptor and the corner expansion receptor. The corner expansion receptor is set at a specific angle relative to the plane of the plate.

In the various embodiments, a top surface is mounted on the top of the base and has a shape that corresponds to the cross-sectional shape formed by the exterior wall and defines fire bowl receptor void substantially in the center of the top surface for receiving a fire bowl.

In various embodiments, the extension pieces include a plate that has an interior surface and an exterior surface. A first flange extends at a first angle from the interior surface proximate to the first end of the plate, wherein the first flange defines the side expansion receptor. A second flange that extends at a second angle from the interior surface proximate to the second end of the plate, wherein the second flange defines the corner expansion receptor. The plate, the first flange and the second flange define a top edge for receiving the top surface and a bottom edge.

In various embodiments, the expansion pieces include an interior expansion surface and an exterior expansion surface. Further, the expansions include a first and second side configured to mate with either the side expansion receptor or the corner expansion receptor of the extensions. The interior expansion surface, the exterior expansion surface and the first and second side are joined to form a rectangular box; and the interior expansion surface and the exterior expansion surface define a venturi assembly receptor void that passes through the rectangular box and is configured to receive a venturi assembly.

In various embodiments, the cooker base includes or receives a plurality of venturi assemblies. The venturi assemblies include a substantially rectangular block and a mounting plate adjoined to one surface of the rectangular block and defining an exterior surface of the venturi assembly. The rectangular block and the mounting plate define a venturi void that passes through the rectangular block. The venturi void is characterized by a substantially rectangular opening on an exterior face of the mounting plate and four surfaces that taper down towards a substantially circular pinch within the interior of the rectangular block, and then taper out in a conical manner to a circular opening on an interior surface of the rectangular block.

In various embodiments, the venturi assembly has a depth D from the exterior surface of the mounting plate to the interior surface of the rectangular block and wherein the circular pinch of the venturi void is located approximately 0.3 D to 0.4 D from the exterior surface of the mounting plate. Further, the rectangular block has a width W and the substantially rectangular opening on the exterior face of the mounting plate is approximately 0.5 W to 0.6 W. In various embodiments, the circular pinch has a diameter of approximately 0.2 W to 0.3 W. In various embodiments, the circular opening on the interior surface of the rectangular block has a diameter of approximately 0.3 W to 0.5 W.

In various embodiments, the mounting plate and the rectangular block may further define two additional voids that have a circular cross section and extend from the surface of the mounting plate, through the interior of the rectangular block and intersect the venturi void at the circular pinch. In exemplary embodiments the diameter of the two additional voids is approximately 1 W to 2 W and the two additional voids are elbow shaped.

In the various embodiments, the expansions that adjoin between the corner expansion receptors may have a length LC1 and the expansions that adjoin between the side expansion receptors have a length LS2 and LC1 is greater than LS2.

In various embodiments, the venturi assembly is inserted into the venturi assembly receptor void of each expansion that adjoins extensions at the corner expansion receptors. Further, cover plates are positioned over the venturi assembly receptor void of each expansion that adjoins extensions at the side expansion receptors.

The various embodiments may include a fire bowl that is removably positioned within the fire bowl receptor void.

The various embodiments may include a grate that is removably positioned above the fire bowl.

The various embodiments may include a cover that is removably positioned above the grate.

The various embodiments may include a support plate that is removably positioned within the fire bowl.

In another embodiment, what is included is a cooker base for receiving a fire bowl, grate and cover. The cooker base includes eight extension pieces, wherein each extension piece includes a wall plate, a side expansion receptor on a first end of the wall plate, a corner expansion receptor on a second end of the wall plate and a first edge and a second edge. Further, the cooker base includes eight expansions, wherein each expansion includes a first side and a second side, and the first side and second side are configured to mate with the side expansion receptor and the corner expansion receptor of an extension piece. The corner expansion receptor is set at a specific angle relative to the plane of the wall plate; and the base is formed by alternated orientations of the eight extension pieces wherein four of the extension pieces has the first side up and the other four of the extension pieces has the second side up and one of the eight expansions adjoined between the two side expansion receptors of adjacent extension pieces and one of the eight expansions adjoined between the two corner expansion receptors of adjacent extension pieces thus forming a closed base that includes a plurality of walls that join together to define an interior void surrounded by an exterior wall. A top surface can then be mounted on the top of the base. The top surface may have a shape that corresponds to the cross-sectional shape formed by the exterior wall and defines fire bowl receptor void substantially in the center of the top surface for receiving a fire bowl.

Further, in some embodiments, each of the extension pieces includes a wall plate having an interior surface and an exterior surface. A first flange extends at a first angle from the interior surface proximate to the first end of the plate, wherein the first flange defines the side expansion receptor. A second flange extends at a second angle from the interior surface proximate to the second end of the plate, wherein the second flange defines the corner expansion receptor. The first flange and the second flange define a top edge for receiving the top surface and a bottom edge. Each of the plurality of the eight expansion pieces includes an interior expansion surface and an exterior expansion surface. Further, the expansions include a first and second side configured to mate with either the side expansion receptor or the corner expansion receptor of the extensions. The interior expansion surface, the exterior expansion surface and the first and second side are joined to form a substantially rectangular box. The interior expansion surface and the exterior expansion surface define a venturi assembly receptor void that passes through the rectangular box and is configured to receive a venturi assembly.

Further features, advantages, characteristics, aspects, etc., that can be incorporated into various embodiments of the versatile cooker are presented in more detail in the following description, with reference being made to the various drawings.

BRIEF DESCRIPTION OF THE SEVERAL VIEWS OF THE DRAWING

FIG. 3 is a side elevation view of the cooker illustrated in FIG. 1.

FIG. 4A is a bottom plan view of the cooker illustrated in FIG. 1.

FIG. 7 is a cross-sectional side elevation view taken at line 7-7 of FIG. 2 of the embodiment cooker illustrated in FIG. 1;

FIG. 8B is a top plan view of the exemplary extension piece illustrated in FIG. 8A.

FIG. 8C is a back-side plan view of the exemplary extension piece illustrated in FIG. 8A.

FIG. 9A is a perspective view of an exemplary expansion that can be used in embodiments of the cooker.

FIG. 9B is a front elevation view of the expansion illustrated in FIG. 9A.

FIG. 9C is a side elevation view of the expansion illustrated in FIG. 9A.

FIG. 9D is a top plan view of the expansion illustrated in FIG. 9A.

FIG. 12A is a perspective view of an exemplary venturi assembly.

FIG. 12B is a perspective view of the exemplary venturi assembly of FIG. 12A with the pieces separated.

DETAILED DESCRIPTION OF THE VARIOUS EMBODIMENTS

The presently described embodiments, as well as features and aspects thereof, is directed towards a new cooker structure and method.

Figure 1:
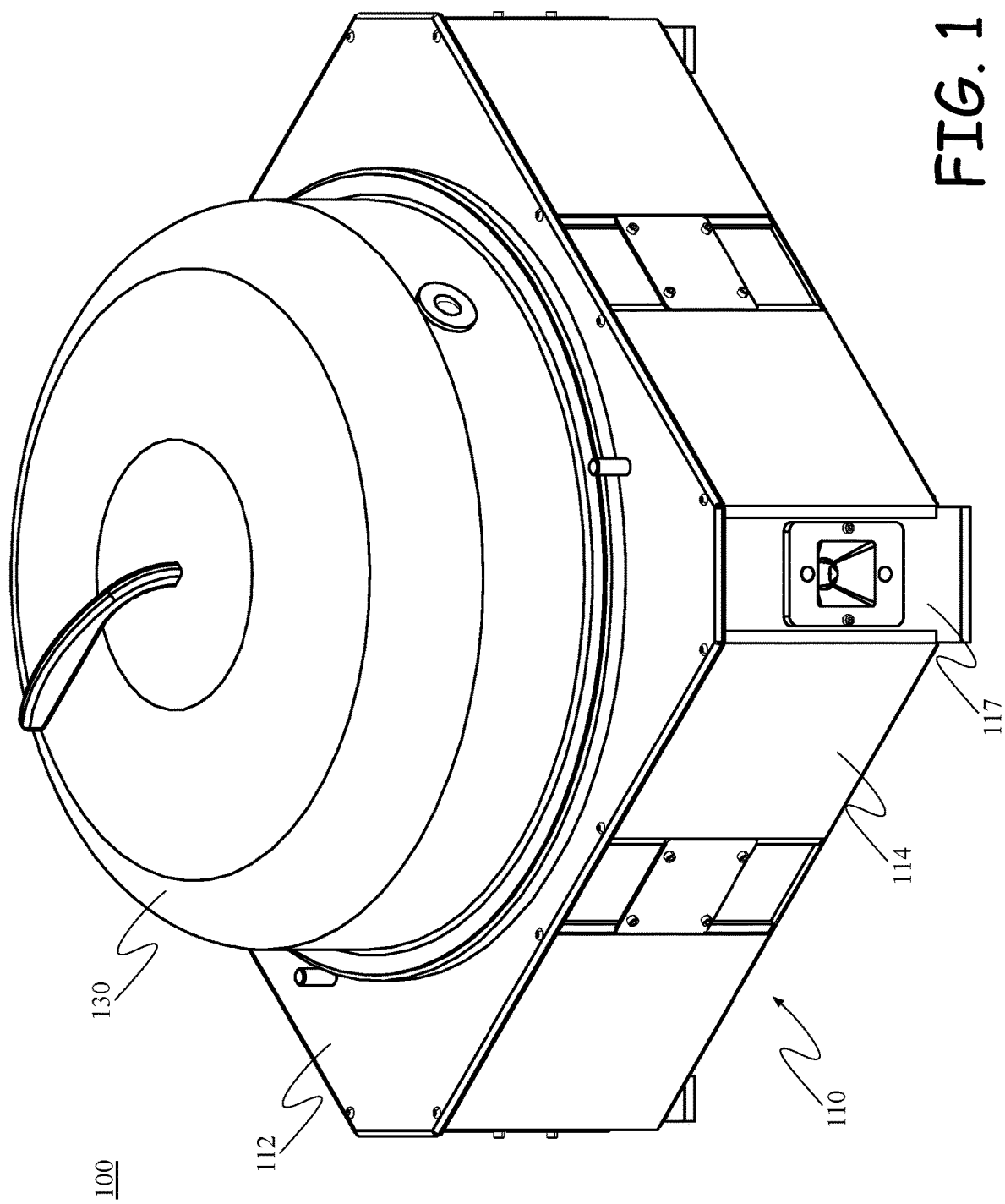
FIG. 1 is a perspective drawing of one embodiment of the cooker.

FIG. 1 is a perspective drawing of one embodiment of the cooker. The cooker 100 is illustrated as including a base 110, a heat or fire bowl 120 (best seen in FIG. 6) and a dome cover or lid 130. In the illustrated embodiment, the base 110 is shown as being a fully assembled into a single unitary element; however, as well be apparent in further drawings, the base 110 can be constructed of multiple pieces that are attached to each other.

Figure 4B:
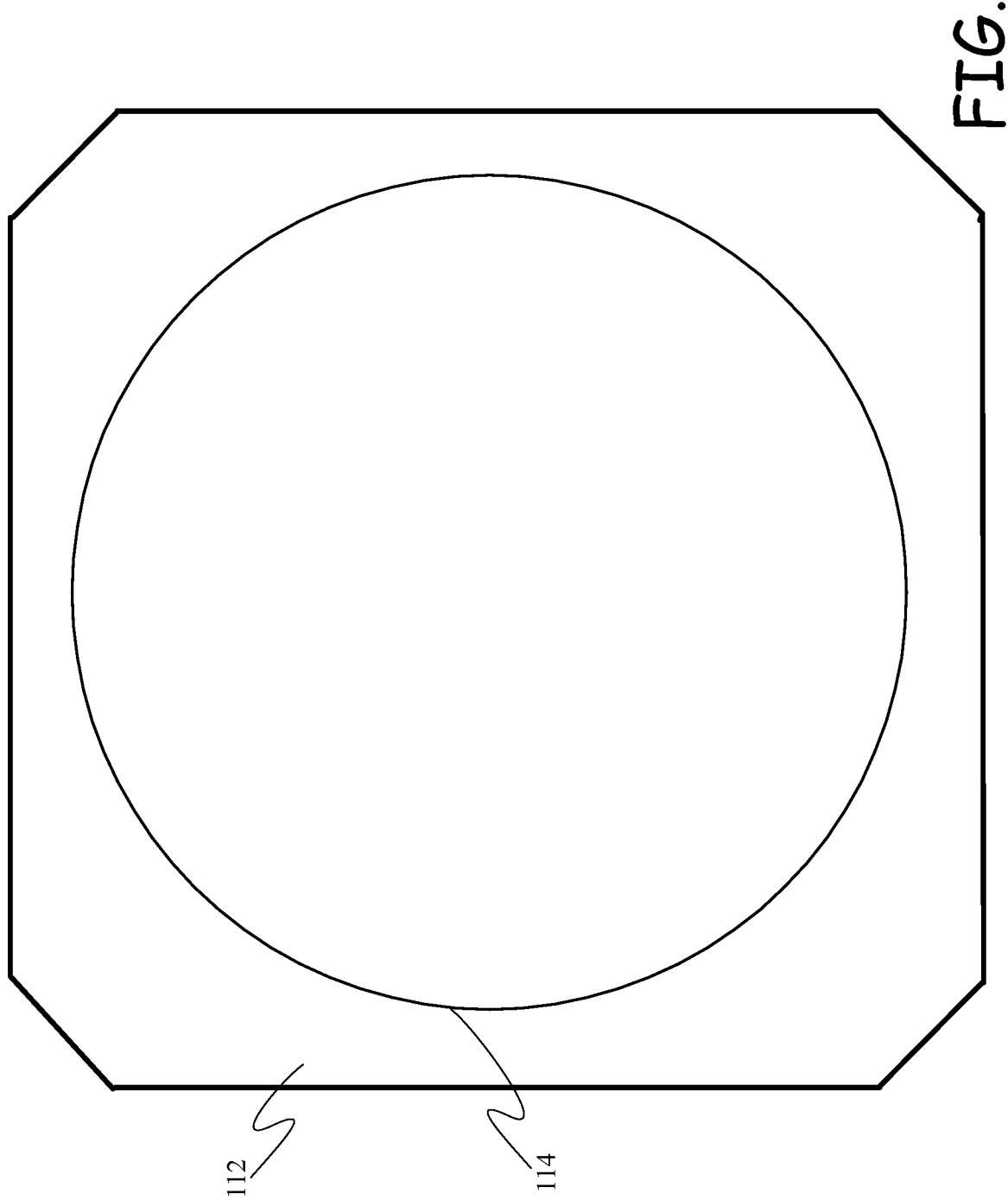
FIG. 4B is a top plan view of the cooker illustrated in FIG. 1 with the top or dome, cooking grate and fire bowl removed.

A top surface 112 is mounted on the top of the base 110 and has a shape that corresponds to the cross-sectional shape formed by the exterior wall 114 of the base 110. The top surface 112 defines a fire bowl receptor void 116 (best seen in FIG. 4B) for receiving the fire bowl 120.

Figure 2:
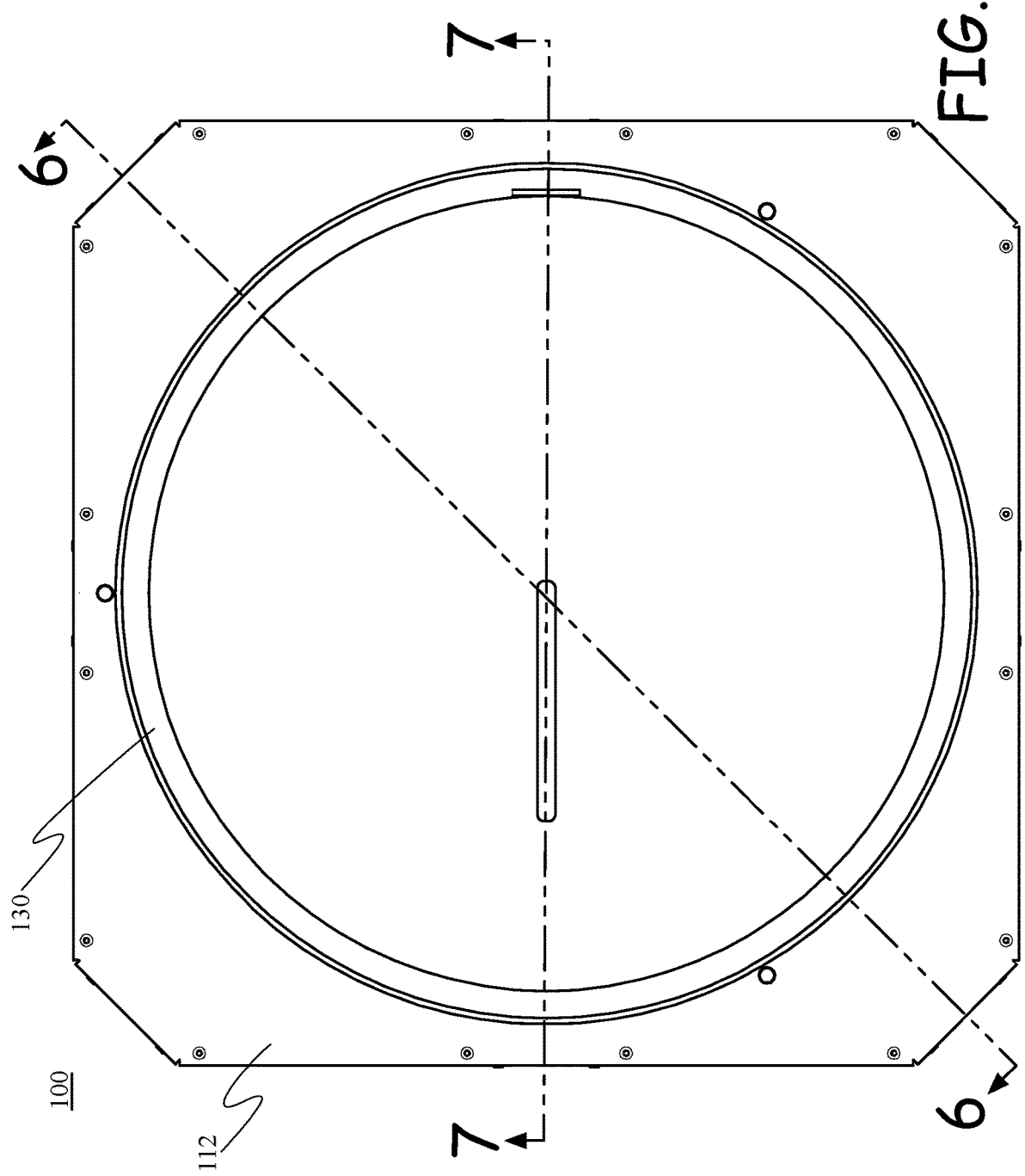
FIG. 2 is top plan view of the embodiment of the cooker illustrated in FIG. 1.

FIG. 2 is top plan view of the embodiment of the cooker illustrated in FIG. 1.

FIG. 3 is a side elevation view of the cooker illustrated in FIG. 1. From this view it can be seen that a side of the base 110 is constructed with two extension pieces 302 that are adjoined together with an expansion 304. On the distal ends of the side wall defined by the extensions 302 and the expansion 304 are two corner expansions 306. The corner expansions 306 are shown as having a length L1 and the expansion 304 that adjoins the extensions 302 have a length of L2. It is illustrated the L1 is larger than L2 and thus, the corner expansions 306 operate as feet for the base 110 to stand on. It should be appreciated than in other embodiments the side expansions and corner expansions may be the same length, thus all operating as legs or the expansions may be shorter such that the bottom of the base 110 sits flat on a surface. In the latter embodiment, additional nobs or legs can be attached to the underside of the base 110. In yet other embodiments, the expansions 304 and 306 may be identical with the same length but then a leg-insert can be inserted into a bottom opening of selected expansions to create feet for holding the base above the resting surface.

Each of the corner expansions 306 are shown as including a venturi assembly 320 that is inserted into a venturi assembly receptor void defined by the surfaces of the expansions 306 (the venturi assembly receptor void is best illustrated in FIG. 9A). The side expansion 304 is illustrated as including a filler plate 322. For ease of manufacturing, the expansions for the sides and the corners are all configured identically, and thus, all including a venturi assembly receptor void. For expansions that do not have a venturi assembly inserted into the venturi assembly receptor void the filler plate 322 is used to cover the venturi assembly receptor void.

A grate 118 is illustrated as resting on top of the base 110 and held into position by pins 324. The dome 130 can be placed on top of the grate 118 and is also held in place by pins 324.

FIG. 4 is a bottom plan view of the cooker illustrated in FIG. 1. In the illustrated embodiment, a bottom plate 402 is shown as being attached under the base 110. The bottom plate 402 is attached to the base 110 using multiple fasteners 404.

Figure 5:
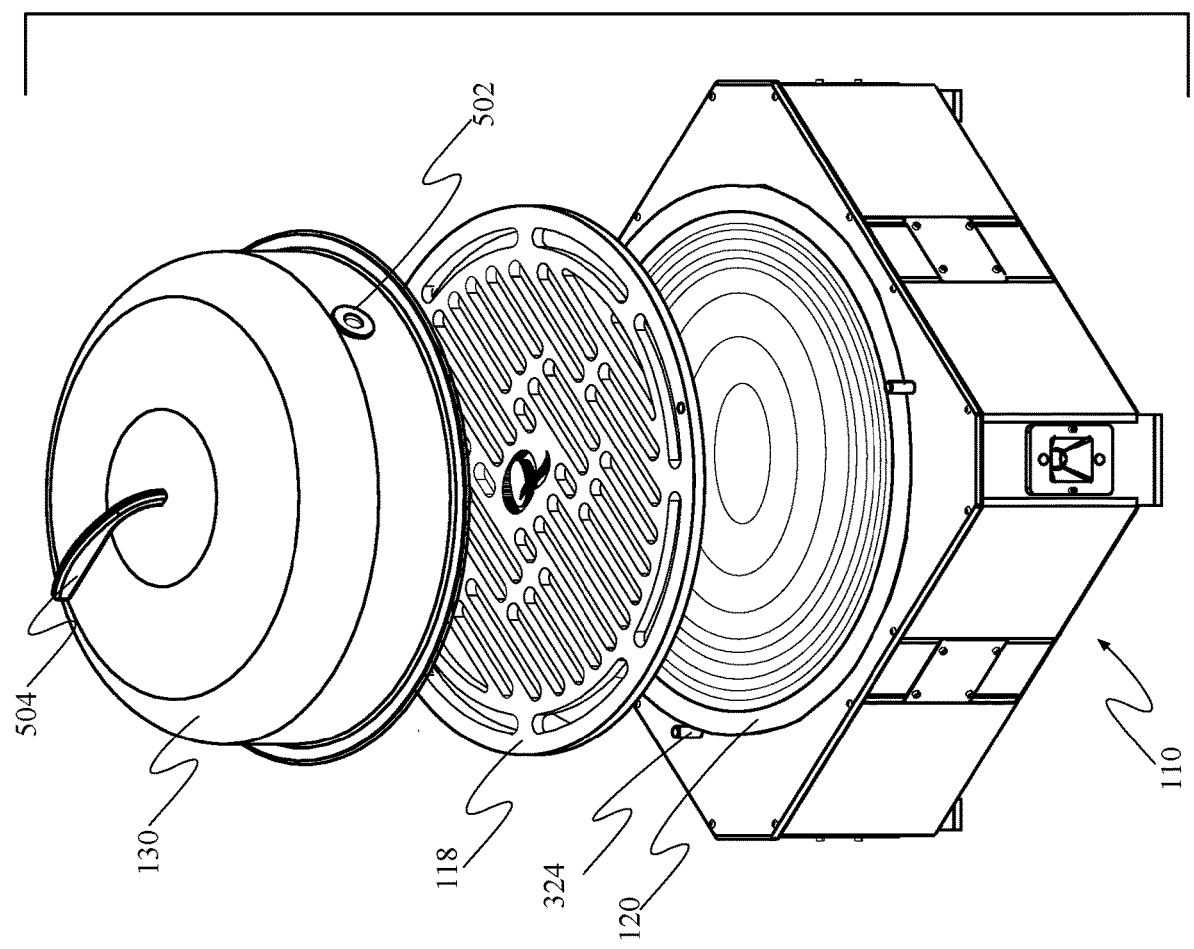
FIG. 5 is a perspective drawing of the embodiment of the cooker illustrated in FIG. 1 with the top or dome in an elevated position.

FIG. 5 is a perspective drawing of the embodiment of the cooker illustrated in FIG. 1 with the top or dome and the grate in an elevated position. From this view it can be seen that the grate 118 can be removed from the base 110 to reveal the fire bowl 120 installed within the fire bowl void 116 defined by the top surface 112 (best illustrated in FIG. 4B). The dome 130 is illustrated as including a vent 502 that passes through the wall of the dome 130 and a handle 504 for lifting the dome 130 from the base 110.

Figure 6:
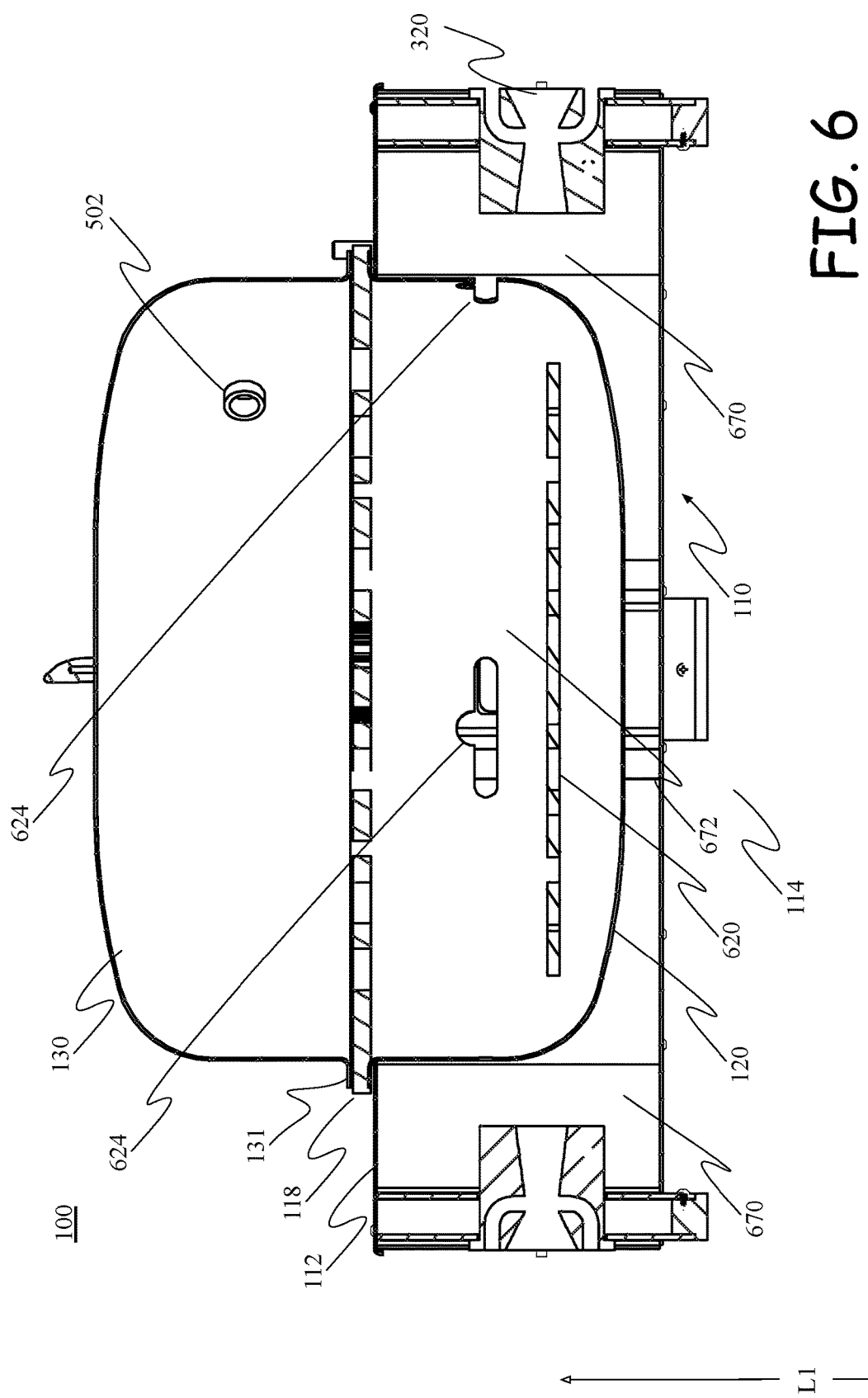
FIG. 6 is a cross-sectional side elevation view taken at line 6-6 of FIG. 2 of the embodiment of the cooker illustrated in FIG. 1.

FIG. 6 is a cross-sectional side elevation view taken at line 6-6 of FIG. 2 of the embodiment of the cooker illustrated in FIG. 1. FIG. 7 is a cross-sectional side elevation view taken at line 7-7 of FIG. 2 of the embodiment cooker illustrated in FIG. 1. From these views, the cooker 100 shows the shape of the venturis that are within the venturi assemblies 320. In the illustrated embodiment, the venturi 602 is a passaged that is defined by the walls or surfaces of the venturi assembly 320. The configuration of the venturi is presented in greater detail in conjunction with FIG. 12A-FIG. 12E. The fire bowl 120 is opened to reveal an interior grate 620 used to hold charcoal, wood, pellets or other fuel. It should be appreciated that the fire bowl 120 can include any type of fuel including charcoal, wood, pellets, natural gas, propane or any combination of one or more of these fuels. Some embodiments may also include a pellet feeder that presents additional fuel into the fire bowl 120 to attain a desired temperature.

The fire bowl 120 is also shown with side openings 624. It is apparent from the illustrated embodiment that the fire bowl openings 624 are not fluidly connected to the venturis 320 through a closed conduit or path but rather, there is a space 670 that is between the fire bowl 120 and the baffles or venturis 320 and this space is a plenum. The combination of the venturis 320 and the fir bowl openings 624 result in the cooker having a side draft indirect aspiration as opposed to an updraft common in many other cookers. Advantageously, the plenum operates to maintain a positive pressure reservoir of air which promotes and even distribution of air without regard to the length of the direct path. Further, the plenum 670 allows for the introduction of colder air (denser/more oxygen) into the combustion chamber 672 of the fire bowl 120 for a hotter fire. Thus, the benefits to the cooker can be realized by comparing the use of the plenum to a similar use in automobiles. Automobile air-boxes (i.e. plenums) and intake manifold plenums (based on the Helmholtz resonance concept) are used in to improve engine aspiration and therefore performance.

Extruded Components for the Base

Figure 8A:
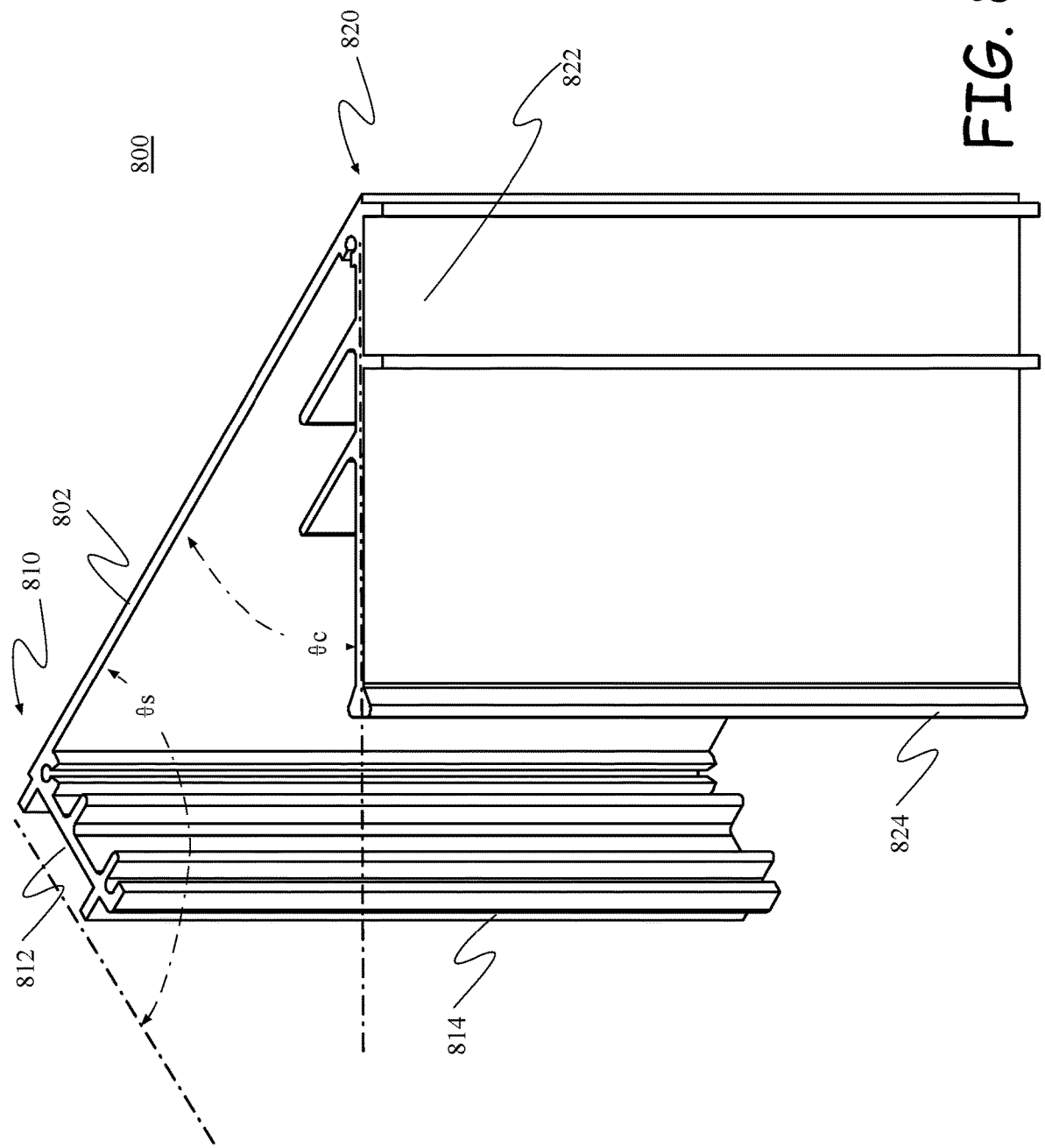
FIG. 8A is a perspective view of an exemplary extension piece that can be used in embodiments of the cooker.

One aspect of various embodiments of the cooker base is utilizing a limited number of extruded parts that are configured such that the base can be easily assembled from the parts. Constructing, in such embodiments the limited number of elements that are used to construct the base can be easily manufactured and shipped. In the illustrated embodiments, the base is essentially constructed from multiple extension pieces and expansion pieces. FIG. 8A is a perspective view of an exemplary extension piece that can be used in embodiments of the cooker. FIG. 8B is a top plan view of the exemplary extension piece illustrated in FIG. 8A. FIG. 8C is a back-side plan view of the exemplary extension piece illustrated in FIG. 8A.

The illustrated extension piece 800 includes a side panel 802 which is generally square or rectangular shaped. In some embodiments, the cooker base may be short and squatty, in which case the side panels of the extension pieces would have a height that is less than the width. In other embodiments, the cooker may be tall, in which case the height of the side panel 802 would be larger than the width. The side panel 802 is typically configured to stand vertically and substantially perpendicular to a lower surface on which the cooker would be situated or sat. However, it should be appreciated that the side panels 802 could also be configured to be at an angle. For instance, if the side panels 802 angled outward from the top, it could create a wider base and increased air flow within the plenum. On the other hand, if the side panels 802 tapered inwardly from the top, it could reduce the size of the plenum but create a larger cooking surface.

In the illustrated embodiment, the side panels 802 include a side end 810 and a corner end 820. The side end 810 includes a side expansion receptor 812. The side expansion receptor 812 provides an interface for receiving, mating with and being adjoined to a side expansion element 304 (see FIG. 3). The corner end 820 includes a corner expansion receptor 822. The corner expansion receptor 822 provides an interface for receiving, mating with and being adjoined to a corner expansion element 306 (see FIG. 3).

The side expansion receptor 812 is integral within a flange 814 that extends from the side end 810 of the side panel 802. The flange 814 is shown as extending from the side end 810 at an angle $\Phi s$, which, in the illustrated embodiment, is substantially 90 degrees from the plane of the side panel 802. However, it should be appreciated that in other embodiments, this angle can be 90 degrees +/−5 degrees, or in other embodiments this angle can be 90 degrees +/−10 degrees, or in other embodiments this angle can be within a range of 45 degrees to 135 degrees or more.

The corner expansion receptor 822 is integral with a corner flange 824 that extends from the corner end 820 of the side panel 802. The flange 824 is shown as extending from the corner end 820 at an angle $\Phi c$, which in the illustrated embodiment is approximately 45 degrees from the plane of the side panel 802. However, it should be appreciated that in other embodiments, this angle can be 45 degrees +/−5 degrees, or in other embodiments, this angle can be 45 degrees +/−10 degrees, or in other embodiments this angle can be within a range of 25 degrees to 135 degrees or more (in either direction).

FIG. 9A is a perspective view of an exemplary expansion that can be used in embodiments of the cooker. FIG. 9B is a front elevation view of the expansion illustrated in FIG. 9A. FIG. 9C is a side elevation view of the expansion illustrated in FIG. 9A. FIG. 9D is a top plan view of the expansion illustrated in FIG. 9A.

The illustrated expansion 900 includes a front face 902, a first side 912 and a second side 922. For purposes of illustration and understandability, the first side is identified with the label 912 to show an association with the side expansion receptor 812 and the second side is identified with the label 922 to show an associated with the corner expansion receptor 922. However, as will be seen in the following, the expansions are either sandwiched between two extension pieces with the side expansion receptors interfacing with the first side and second side of the expansion (side expansion) or the corner expansion receptors with the first side and second side of the expansion (corner expansion).

The top 904 and the bottom 906 of the expansion 900 are illustrated as being opened. It should be appreciated that in some embodiments, a cap or insert can be inserted into the to or top 904 or bottom 906 to close the opening. Further, in some embodiments, the expansions 900 used for the corners may be longer than the expansions 900 used for the sides, thus creating legs that the base is raised upon. In other embodiments, the expansions 900 may all be the same size but feet can be inserted into the bottoms 906 of the corner expansions to create legs that the base is raised upon. In yet other embodiments, the side expansions and corner expansions are all the same length.

The expansion 900 is shown as defining a hole or aperture 930 that passes through the expansion 900. Thus, the interior surface and the exterior surface of the expansion define a venturi assembly receptor void that passes through the rectangular box and is configured to receive a venturi assembly. On the left and right side of the aperture, the expansion 900 defines attachment apertures 932 and 934. The attachment apertures 932 and 934 correspond with apertures on the venturi assemblies and are used to attach the venturi assemblies to the expansion 900. Typically, as illustrated in the various embodiments, the venturi assemblies are attached within the corner expansions, however, in other embodiments, the venturis could be inserted into the side expansions or both. For the expansions that do not include a venturi assembly, a plate can be attached over the venturi assembly receptor void. In some embodiments, this may be a decorative plate, or a plate that includes model numbers, branding, etc.

Figures 10A, 10B:
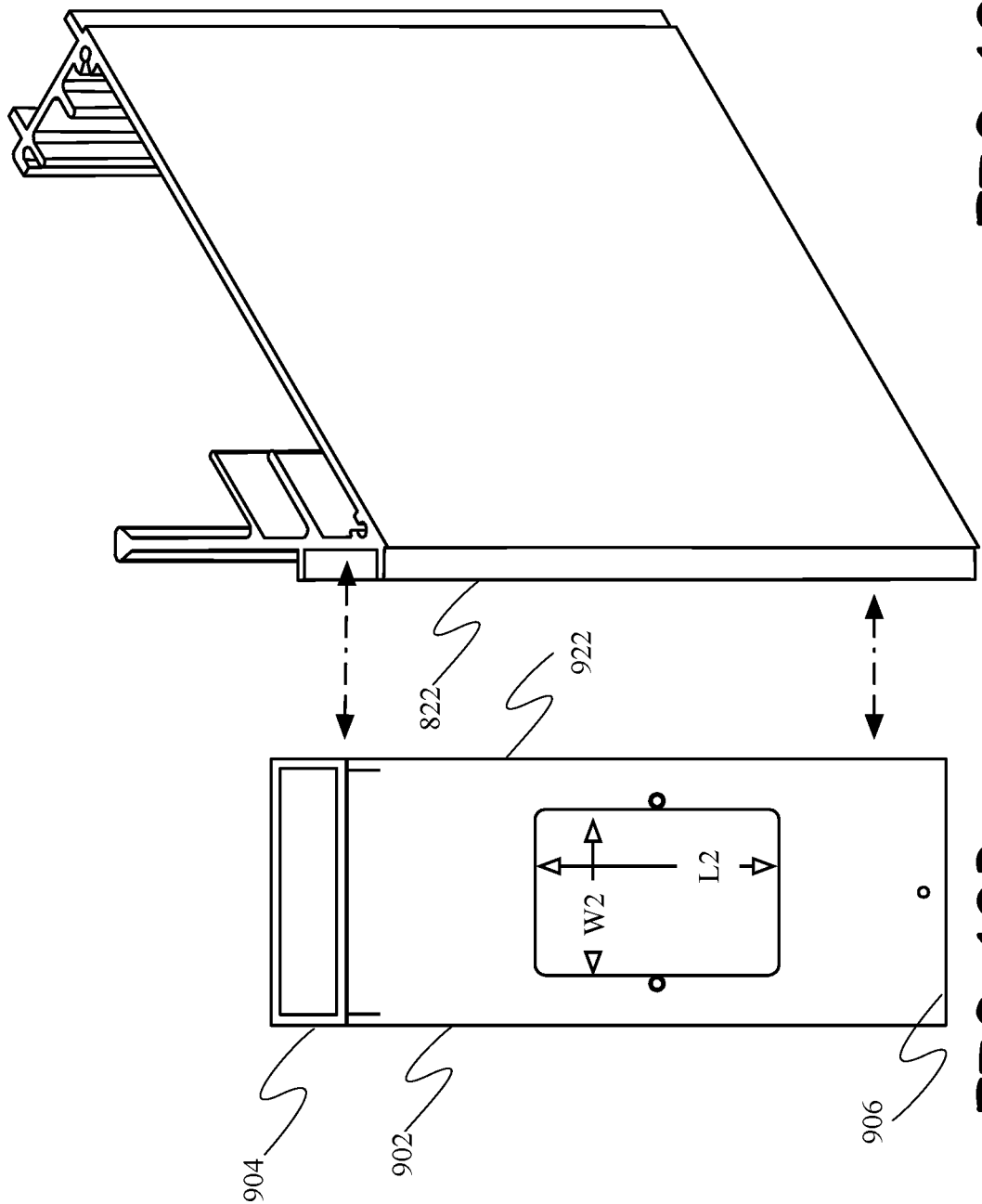
FIG. 10A is a perspective view of an exemplary extension piece.
FIG. 10B is a perspective view of an exemplary expansion.

FIG. 10A is a perspective view of an exemplary extension piece. FIG. 10B is a perspective view of an exemplary expansion. Together, FIG. 10A and FIG. 10B illustrate how the corner side 922 of an expansion 900 is inserted into a corner expansion receptor 822 of an extension 800.

Figure 11:
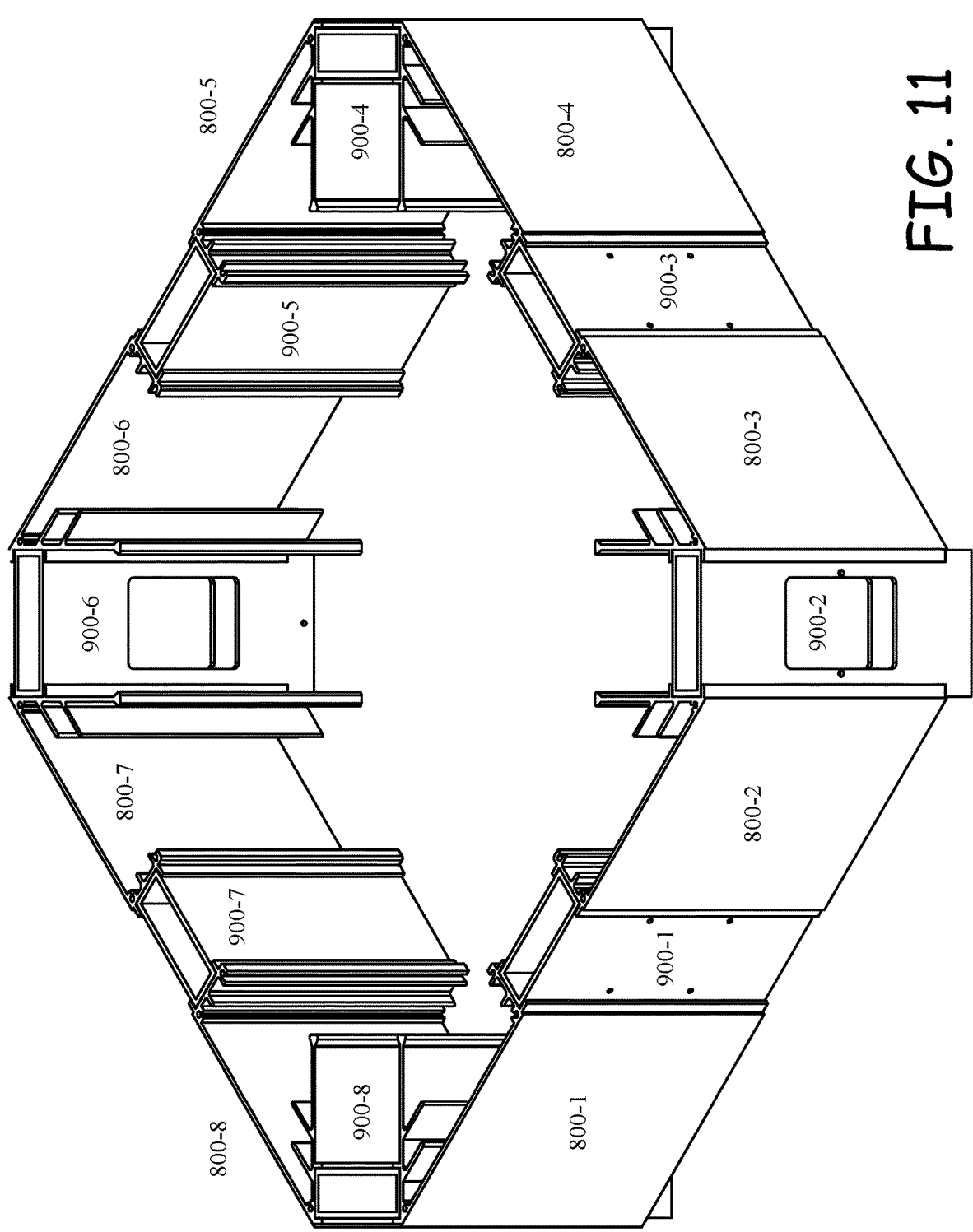
FIG. 11 is a perspective view of a base of an embodiment of the cooker constructed with extensions as presented in FIGS. 8A-8C and expansion as presented in FIG. 9A-9D.

FIG. 11 is a perspective view of a base of an embodiment of the cooker constructed with extensions as presented in FIGS. 8A-8C and expansions as presented in FIG. 9A-9D. Thus, it can be appreciated from FIG. 11 that the base is constructed from a plurality of extension pieces 800-1 to 800-8 joined together with a plurality of expansions 900-1 to 900-8. Constructing the base in this manner advantageously allows the base to be fabricated from only two unique parts: extension pieces 800 and expansions 900. Building the base can be described algorithmically as follows:

an extension(800-*i*) is adjoined to an extension(800-(*i*+1)) at the side expansion receptors by an expansion(900-*i*);
the extension(800-*i*+1) is then adjoined to an extension (800-(*i*+2)) at the corner expansion receptors by an expansion(900-(*i*+1));
for i=1 to n, where i is a variable that is incremented by 2 each pass and n is an even number equal to the number of the plurality of expansions such that expansion(800-*n*) is adjoined to expansion(800-1) at the corner expansion receptors by expansion(900-*n*) thus forming a closed base that includes a plurality of walls that join together to define an interior void surrounded by an exterior wall.

FIG. 12A is a perspective view of an exemplary venturi assembly. FIG. 12B is a perspective view of the exemplary venturi assembly of FIG. 12A with the pieces separated. The venturi assembly 1200 includes two identical structures 1202 that can be rotated 180 degrees from each other and then fitted together to form the venturi assembly. The interior surface of the venturi structures 1202 include a protrusion 1210 and a detent 1212. When the venturi structures 1202 are rotated such that the interior surfaces 1204 are facing each other, the detent 1212 of a first venturi structure 1202 aligns with the protrusion 1210 of a second venturi structure 1202, and the protrusion of the first venturi structure 1202 aligns with the detent of the second venturi structure 1202 to thus hold the pieces in relative position to each other. When the venturi structures 1202 are adjoined to each other to create a venturi assembly 1200, a passage 1220 through the venturi assembly 1200 is defined.

Figures 12C, 12D:
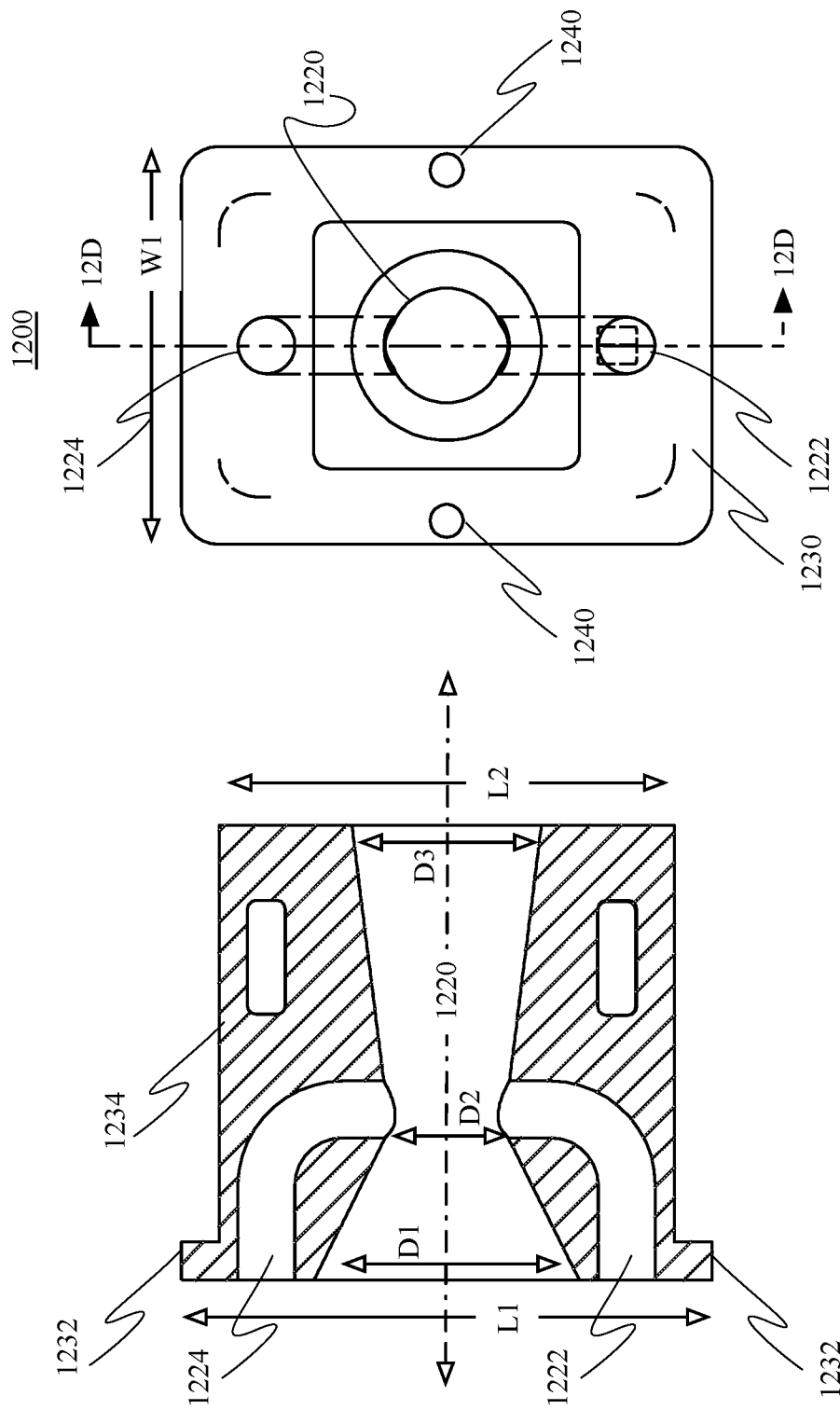
FIG. 12C is a front elevation view of the mounting plate of the venturi assembly of FIG. 12A.
FIG. 12D is a cross-sectional view of the exemplary venturi assembly of FIG. 12A taken at the line 12D-12D as illustrated in FIG. 12C.

FIG. 12C is a front elevation view of the mounting plate of the venturi assembly of FIG. 12A. The venturi structures 1202, when joined together, define a front plate 1230 that includes a flange 1232 that has a length L1 just slightly larger than the block 1234 L2 of the venturi assembly 1200. Further, the flange 1232 has a width W1 that is larger than the block 1234 W2. The length L2 and width W2 of the block 1234 correspond with the dimensions of the venturi assembly receptor void 930 in the expansion 900 such that the venturi assembly 1200 can snuggly fit within the venturi assembly receptor void 930.

FIG. 12D is a cross-sectional view of the exemplary venturi assembly of FIG. 12A taken at the line 12D-12D as illustrated in FIG. 12C. FIG. 12C shows an upper voice 1224, a lower void 1222 and a central void 1220. As best illustrated in FIG. 12D, the upper void 1224 extends into the block 1234 and then elbows down to the central void 1220. Likewise, the lower void 1222 extends into the block 1234 and then elbows towards the central void 1220. The upper void 1224 and the lower void 1222 ultimately intersect and open into the central void 1220.

The central void 1220, as best illustrated in FIG. 12D, starts at a particular diameter D1, then tapers to diameter D2 and then expands back out to diameter D3.

Figure 12E:
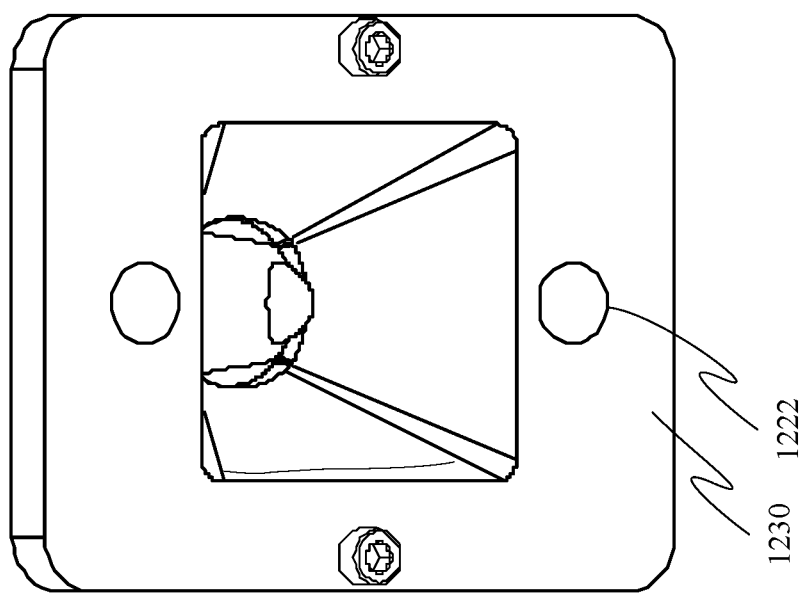
FIG. 12E is a perspective view of the exemplary venturi assembly of FIG. 12A from the front view.

FIG. 12E is a perspective view of the exemplary venturi assembly of FIG. 12A from the front view. As best seen in FIG. 12E, the central void 1220 at the front of the venturi assembly 1220 is rectangular in shape and the sides taper to a round hole having the diameter D2. From this point, the central void 1220 then expands out in a conical fashion to diameter D3. It should be appreciated that this is just one exemplary configuration of a venturi. Those skilled in the art will understand that other configurations may also be employed, such as a conical taper on the front and/or a rectangular taper at the back, more or fewer intersecting voids such as upper void 1224 and lower void 1222, etc.

The Base

In general, the base 110 operates as a fire pit, holding the components of the fire bowl 120 in place and providing insulation from the surface on which the cooker 100 rests and other nearby elements. The base can be fabricated from a variety of materials as long as the materials can withstand the heat and, in some embodiments, provide a level of insulation and/or heat sinking. In one embodiment, the base 110 is constructed from extruded aluminum pieces.

The base 110 is shown as being substantially square shaped with a depth height of several inches, however the height of the base is not limited as the base could be of any height depending on the particular application desired. In the typical embodiments to be described, the base can be from 2-3 inches up to 8-10 inches in height as a non-limiting example. However, in other embodiments, virtually any depth is anticipated.

The base 110, although shown as square with tapered or beveled corners, may take on a variety of shapes and the shapes presented herein, although they may be considered as novel, are not limiting but rather exemplary. The illustrated base 110 is shown as having its corners 117 shaved off or beveled to create a non-equilateral octagon.

The top surface 112 rests on top of base 110 or the various extension pieces and expansions. It should be appreciated that the top surface 112 can be removable in some embodiments, or affixed to the base 110 in other embodiments. To attach the top surface 112 to the base 110, screws or fasteners can be inserted through apertures on the top surface 112 that align with receptors 830 in the extension pieces 800.

In various embodiments, the venturi assemblies 1200 are inserted into the corner expansions 900 of the base 110 thus creating one or more apertures 1220 that extend from the exterior wall of the base 110 into a void 670 or plenum defined by the base 110. In the illustrated embodiments, the aperture 1220 is a venturi. As those skilled in the art will appreciate, a venturi is a short tube with a tapering constriction in the middle that causes an increase in the velocity of flow of a fluid or gas and a corresponding decrease in fluid pressure and that is used especially in measuring fluid flow or for creating a suction (as for driving aircraft instruments or drawing fuel into the flow stream of a carburetor).

It will be appreciated that the venturi is only one technique that can be used to create increased airflow within the fire bowl 120. Other accelerators may also be utilized such as electronic fans, piezoelectric air movers, vacuum sources, etc. These other sources may be used in lieu of a venturi or in conjunction therewith.

Fire Bowl

The fire bowl 120 sits down inside the void 670 defined by the base 110. The interface between the fire bowl 120 and the base 110 is flange on the top of the fire bowl that rests on the top surface 112.

The fire bowl 120 includes one or more orifices or apertures 624 that allow air to be pulled into the fire bowl from the apertures 1220 of the venturi assemblies 1200 within the base.

The cooking grill or grill surface 118 sits above the fire bowl 120 and receives items to be cooked. In the illustrated embodiment, the grill 118 is round and has a diameter slightly larger than the opening into the fire bowl 120. In some embodiments, the grill is constructed of carbon steel and has a substantial mass. Carbon steel is presented as the material for the construction of the grill because of is conductive characteristics. However, it will be appreciated that the grill could be fabricated from stainless steel, as well as a variety of other materials. In a particular embodiment, the gill 118 is designed to provide a large amount of mass for retaining heat and providing a profession grade cooking surface. As such, the grill 118 can advantageously be constructed of carbon steel. The slots in the grill have a thickness of 0.625 inches while the wall between them is typically around 0.375 inches. Although a wide variety of materials and structures may be utilized in various embodiments, the carbon steel material with a ratio of surface to hole as illustrated in this embodiment has been shown to provide good results.

Dome Cover or Lid

A dome cover or lid 130 sits on top of the cooking surface 118 and over the fire bowl 120. The dome cover 130 includes a lower lip 131 that rests upon the cooking surface or grate 118. The lower lip 131 of the dome cover 130 is illustrated as flaring outwards but, it will be appreciated that it could be tucked under, flat, or in line with the remainder of the dome cover 130. From the lower lip, a side-wall extends upwardly to the top, where the dome includes a handle 504 for lifting and moving of the dome. In the illustrated embodiment, concentric ridges and grooves can be provided to help dissipate heat, provide strength to the cover and/or aesthetic appeal.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A cooker base for receiving a fire bowl, grate and cover, the cooker base comprising:
    a plurality of extension pieces, wherein each extension piece includes a side expansion receptor on a first end of a plate and a corner expansion receptor on a second end of the plate;
    a plurality of expansions, wherein each expansion includes a first side and a second side, and the first side and second side are configured to mate with the side expansion receptor and the corner expansion receptor;
    wherein the corner expansion receptor is set at a specific angle relative to the plane of the plate; and
    wherein the base is formed by:
        an extension piece(i) adjoined to an extension piece(i+1) at the side expansion receptors by an expansion(i); and
        the extension piece(i+1) adjoined to an extension piece (i+2) at the corner expansion receptors by an expansion(i+1);
        for i=1 to n, where i is a variable that is incremented by 2 each pass and n is an even number equal to the number of the plurality of plurality of extension pieces such that extension piece(n) is adjoined to extension piece(1) at the corner expansion receptors by expansion(n) thus forming a closed base that includes a plurality of walls that join together to define an interior void surrounded by an exterior wall; and
    a top surface that is mounted on the top of the base and has a shape that corresponds to the cross-sectional shape formed by the exterior wall and defines a fire bowl receptor void within the top surface for receiving a fire bowl.

2. The cooker base of claim 1, wherein each of the plurality of extension pieces further comprise:
    the plate having an interior surface and an exterior surface;
    a first flange that extends at a first angle from the interior surface proximate to the first end of the plate, wherein the first flange defines the side expansion receptor;

a second flange that extends at a second angle from the interior surface proximate to the second end of the plate, wherein the second flange defines the corner expansion receptor; and wherein the plate, the first flange and the second flange define a top edge for receiving the top surface and a bottom edge.

3. The cooker base of claim 1, wherein each of the plurality of expansion pieces further comprise:

an interior expansion surface;

an exterior expansion surface;

a first and second side configured to mate with either the side expansion receptor or the corner expansion receptor of the extensions;

wherein the interior expansion surface, the exterior expansion surface and the first and second side are joined to form a rectangular box; and wherein the interior expansion surface and the exterior expansion surface define a venturi assembly receptor void that passes through the rectangular box and is configured to receive a venturi assembly.

4. The cooker base of claim 1, further comprising a plurality of venturi assemblies, wherein each of the plurality of venturi assemblies comprises:

a rectangular block;

a mounting plate adjoined to one surface of the rectangular block and defining an exterior surface of the venturi assembly;

wherein the rectangular block and the mounting plate define a venturi void that passes through the rectangular block; and wherein the venturi void is characterized by a rectangular opening on an exterior face of the mounting plate and four surfaces that taper down towards a circular pinch within the interior of the rectangular block, and then taper out in a conical manner to a circular opening on an interior surface of the rectangular block.

5. The cooker base of claim 4, wherein each of the plurality of venturi assemblies has a depth D from the exterior surface of the mounting plate to the interior surface of the rectangular block and wherein the circular pinch of the venturi void is located 0.3 D to 0.4 D from the exterior surface of the mounting plate.

6. The cooker base of claim 5, wherein the rectangular block has a width W and the rectangular opening on the exterior face of the mounting plate is 0.5 W to 0.6 W.

7. The cooker base of claim 6, wherein the circular pinch has a diameter of 0.2 W to 0.3 W.

8. The cooker base of claim 7, wherein the circular opening on the interior surface of the rectangular block has a diameter of 0.3 W to 0.5 W.

9. The cooker base of claim 8, wherein the mounting plate and the rectangular block further define two additional voids that have a circular cross section and extend from the surface of the mounting plate, through the interior of the rectangular block and intersect the venturi void at the circular pinch.

10. The cooker base of claim 9, wherein the diameter of the two additional voids is 1 W to 2 W.

11. The cooker base of claim 10, wherein the two additional voids are elbow shaped.

12. The cooker base of claim 11, wherein the expansions that adjoin between the corner expansion receptors have a length L1 and the expansions that adjoin between the side expansion receptors have a length L2 and L1 is greater than L2.

13. The cooker base of claim 12, wherein one of the plurality of venturi assemblies is inserted into the venturi assembly receptor void of each expansion that adjoins extensions at the corner expansion receptors.

14. The cooker base of claim 13, further comprising a plurality of cover plates and wherein one of the plurality of cover plates is positioned over the venturi assembly receptor void of each expansion that adjoins extensions at the side expansion receptors.

15. The cooker base of claim 1, further comprising a fire bowl that is removably positioned within the fire bowl receptor void.

16. The cooker base of claim 15, further comprising a grate that is removably positioned above the fire bowl.

17. The cooker base of claim 16, further comprising a cover that is removably positioned above the grate.

18. The cooker base of claim 17, further comprising a support plate that is removably positioned within the fire bowl.

19. A cooker base for receiving a fire bowl, grate and cover, the cooker base comprising:

eight extension pieces, wherein each extension piece includes a wall plate, a side expansion receptor on a first end of the wall plate, a corner expansion receptor on a second end of the wall plate and a first edge and a second edge;

eight expansions, wherein each expansion includes a first side and a second side, and the first side and second side are configured to mate with the side expansion receptor and the corner expansion receptor of one of the extension pieces;

wherein the corner expansion receptor is set at a specific angle relative to the plane of the wall plate; and wherein the base is formed by alternated orientations of the eight extension pieces wherein four of the extension pieces have the first side up and the other four of the extension pieces have the second side up and one of the eight expansions adjoined between the two side expansion receptors of adjacent extension pieces and one of the eight expansions adjoined between the two corner expansion receptors of adjacent extension pieces thus forming a closed base that includes a plurality of walls that join together to define an interior void surrounded by an exterior wall; and a top surface that is mounted on the top of the base and has a shape that corresponds to the cross-sectional shape formed by the exterior wall and defines a fire bowl receptor void within the top surface for receiving a fire bowl.

20. The cooker base of claim 19, wherein each of the eight of extension pieces further comprise:

the wall plate having an interior surface and an exterior surface;

a first flange that extends at a first angle from the interior surface proximate to the first end of the plate, wherein the first flange defines the side expansion receptor;

a second flange that extends at a second angle from the interior surface proximate to the second end of the plate, wherein the second flange defines the corner expansion receptor; and wherein the plate, the first flange and the second flange define a top edge for receiving the top surface and a bottom edge;

wherein each of the plurality of the eight expansion pieces further comprise:

an interior expansion surface;

an exterior expansion surface;

a first and second side configured to mate with either the side expansion receptor or the corner expansion receptor of the extensions;

wherein the interior expansion surface, the exterior expansion surface and the first and second side are joined to form a rectangular box;

wherein the interior expansion surface and the exterior expansion surface define a venturi assembly receptor void that passes through the rectangular box and is configured to receive a venturi assembly; and wherein four of the expansions have a length of L1 and four of the expansions have a length of L2, with L1 being greater than L2, and the expansions of L1 length adjoined between the corner expansion receptors of two adjacent extensions; and further comprising a plurality of venturi assemblies, wherein each of the plurality of venturi assemblies comprises:

a rectangular block;

a mounting plate adjoined to one surface of the rectangular block and defining an exterior surface of the venturi assembly;

wherein the rectangular block and the mounting plate define a venturi void that passes through the rectangular block; and wherein the venturi void is characterized by a rectangular opening on an exterior face of the mounting plate and four surfaces that taper down towards a circular pinch within the interior of the rectangular block, and then taper out in a conical manner to a circular opening on an interior surface of the rectangular block.

\* \* \* \* \*